United States Patent
Steffens, Jr.

(10) Patent No.: US 7,077,472 B2
(45) Date of Patent: Jul. 18, 2006

(54) APPARATUS WITH ACTUATABLE TETHER FOR RESISTING REARWARD MOVEMENT OF A BACKREST PORTION OF A SEAT

(75) Inventor: Charles E. Steffens, Jr., Washington, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 11/172,068

(22) Filed: Jun. 30, 2005

(65) Prior Publication Data

US 2005/0280295 A1    Dec. 22, 2005

Related U.S. Application Data

(63) Continuation-in-part of application No. 10/455,703, filed on Jun. 5, 2003, now abandoned.

(51) Int. Cl.
*B60N 2/42* (2006.01)
(52) U.S. Cl. ............... 297/216.13; 297/216.12
(58) Field of Classification Search .......... 297/216.13, 297/216.14, 216.12, 216.1, 404
See application file for complete search history.

(56) References Cited

U.S. PATENT DOCUMENTS

| | | | |
|---|---|---|---|
| 5,295,729 A | 3/1994 | Viano | |
| 5,366,268 A * | 11/1994 | Miller et al. ............. | 297/216.1 |
| 5,370,440 A * | 12/1994 | Rogala .................. | 297/216.14 |
| 5,401,072 A | 3/1995 | Farrand | |
| 5,641,198 A | 6/1997 | Steffens, Jr. | |
| 5,795,019 A | 8/1998 | Wieclawski | |
| 5,823,619 A | 10/1998 | Heilig et al. | |
| 5,884,968 A | 3/1999 | Massara | |
| 6,019,424 A | 2/2000 | Ruckert et al. | |
| 6,022,074 A | 2/2000 | Swedenklef | |
| 6,050,637 A | 4/2000 | Haland et al. | |
| 6,139,111 A | 10/2000 | Pywell et al. | |
| 6,152,526 A | 11/2000 | Persson et al. | |
| 6,164,720 A | 12/2000 | Haglund | |
| 6,179,379 B1 | 1/2001 | Andersson | |
| 6,199,947 B1 | 3/2001 | Wiklund | |
| 6,250,714 B1 | 6/2001 | Nakano et al. | |
| 6,273,511 B1 | 8/2001 | Wieclawski | |
| 6,340,206 B1 | 1/2002 | Andersson et al. | |
| 6,375,262 B1 | 4/2002 | Watanabe | |
| 6,394,393 B1 * | 5/2002 | Mort ...................... | 244/122 R |
| 6,416,125 B1 | 7/2002 | Shah et al. | |
| 6,508,500 B1 | 1/2003 | Bowers | |
| 2001/0038233 A1 | 11/2001 | Eklind | |

* cited by examiner

*Primary Examiner*—Milton Nelson, Jr.
(74) *Attorney, Agent, or Firm*—Tarolli, Sundheim, Covell & Tummino LLP

(57) ABSTRACT

An apparatus (8) includes a seat (10) for an occupant (12) of a vehicle (14). The seat (10) includes a cushion portion (16) and a backrest portion (18). The apparatus (8) also includes an occupant protection device (70) that, when actuated, resists rearward movement of the backrest portion (18) of the seat (10) relative to the cushion portion (16) of the seat (10). A deflection mechanism (72) of the apparatus (8) is located in the backrest portion (18) of the seat (10) and is movable from a first position to a second position for actuating the occupant protection device (70). The deflection mechanism (72) is adapted to move from the first position to the second position without the backrest portion (18) moving significantly relative to cushion portion (16).

26 Claims, 8 Drawing Sheets

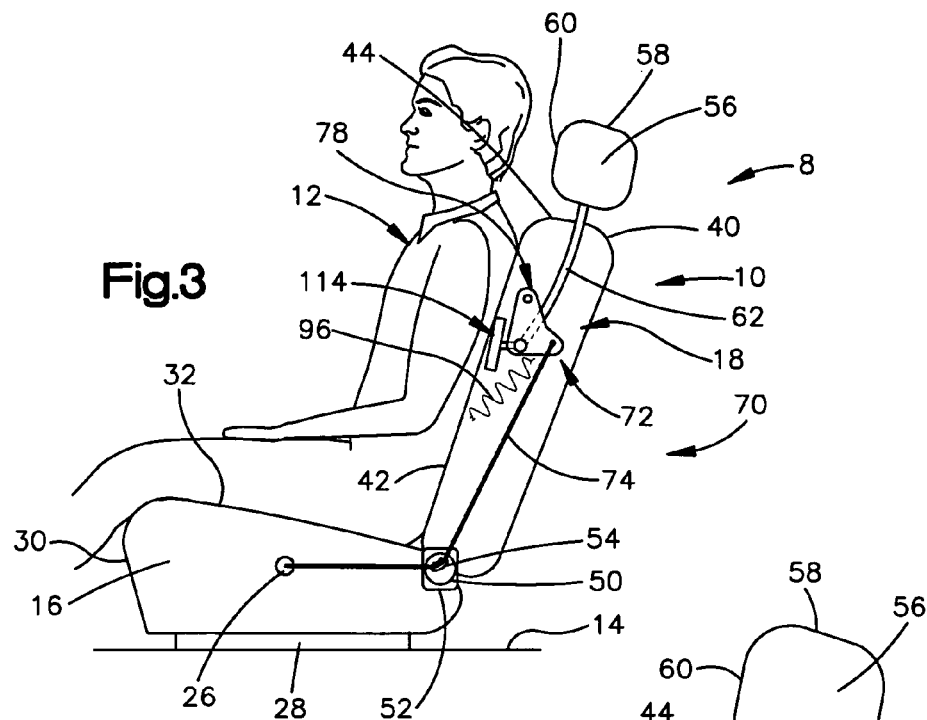

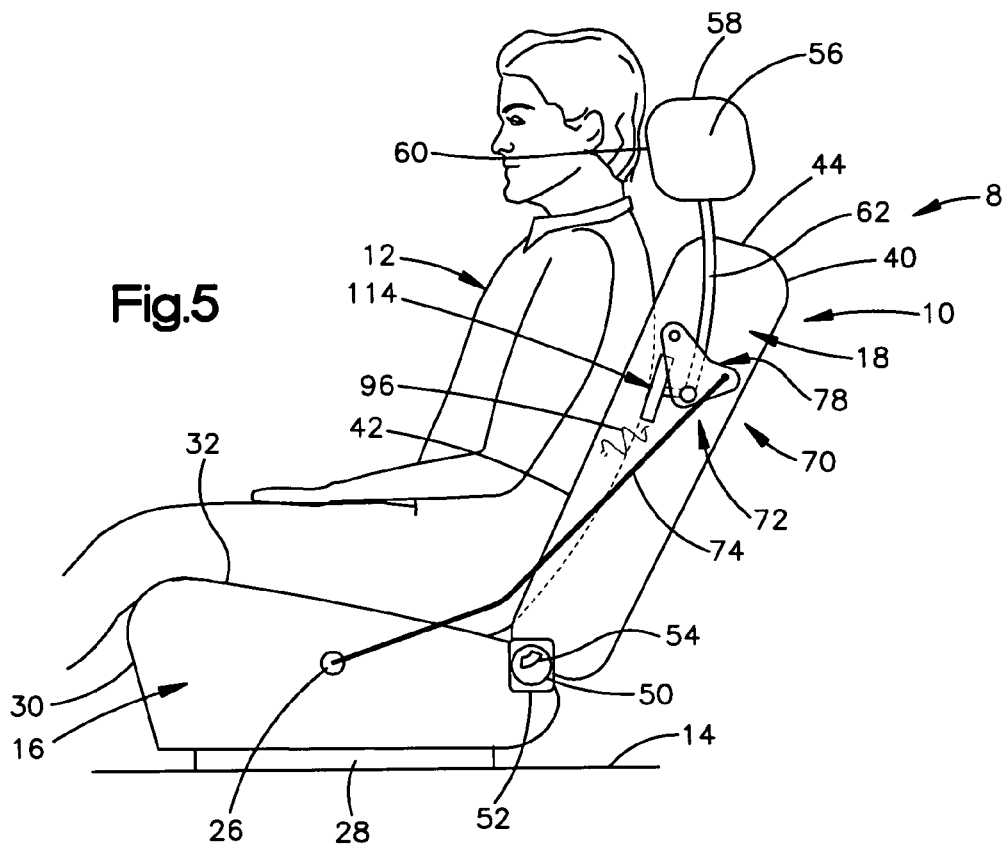
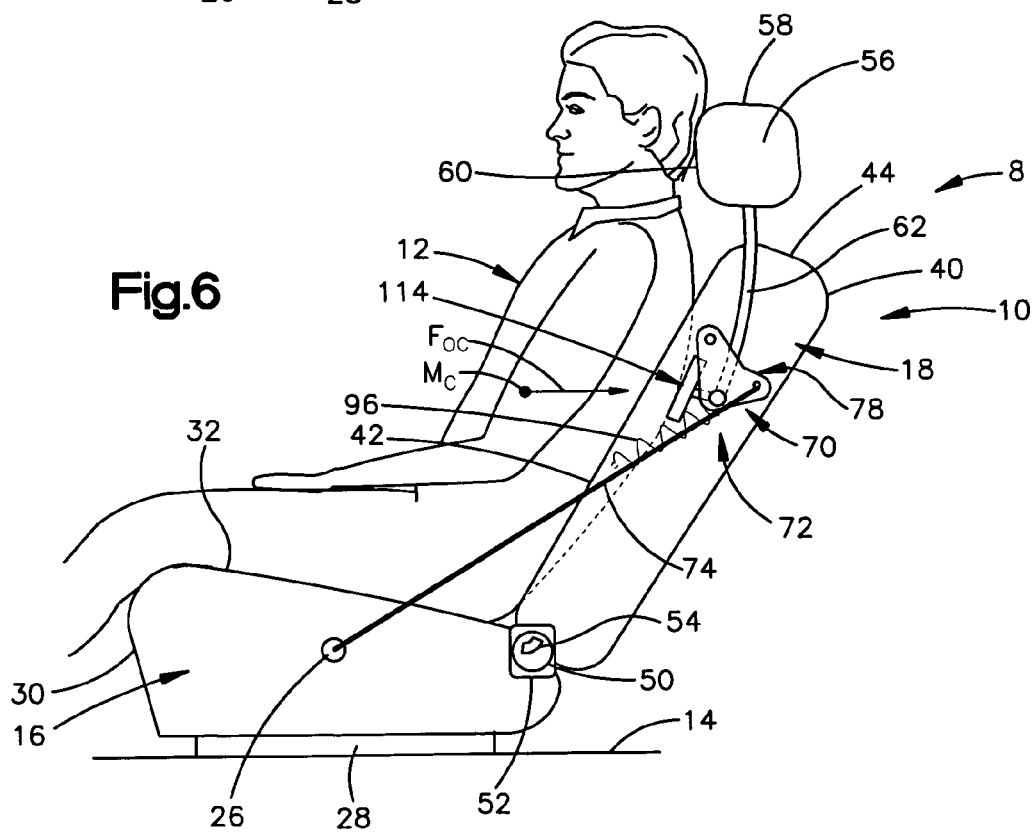

APPARATUS WITH ACTUATABLE TETHER FOR RESISTING REARWARD MOVEMENT OF A BACKREST PORTION OF A SEAT

RELATED APPLICATIONS

This application is a continuation-in-part of patent application Ser. No. 10/455,703, filed Jun. 5, 2003, and now abandoned.

TECHNICAL FIELD

The present invention relates to an apparatus with an actuatable tether for resisting rearward movement of a backrest portion of a seat.

BACKGROUND OF THE INVENTION

A conventional seat for an occupant of a vehicle includes a cushion portion and a backrest portion. The cushion portion of the seat is attached to the vehicle body, generally through rails. The cushion portion of the seat supports the backrest portion of the seat. In many conventional designs, a pivot mechanism attaches the backrest portion to the cushion portion and enables pivotal movement of the backrest portion of the seat relative to the cushion portion in both a forward and rearward direction.

During a rear impact to the vehicle, relative movement between the occupant and the vehicle results in a force being applied by the occupant against the backrest portion of the seat. In order to restrain the occupant in the seat during the rear impact, the pivot mechanism of the seat must resist movement of the backrest portion of the seat relative to the cushion portion of the seat in response to the force applied by the occupant against the backrest portion of the seat.

The force applied by the occupant against the backrest portion of the seat results in a torque about the pivot mechanism that tends to rotate the backrest portion of the seat rearward relative to the cushion portion of the seat. The occupant loading can overwhelm the seat structure or the seat latch assembly associated with the pivot mechanism.

In other conventional designs, the backrest portion of the seat is fixed relative to the cushion portion. During a rear impact to the vehicle, relative movement between the occupant and the vehicle results in a force being applied by the occupant against the backrest portion of the seat. In order to restrain the occupant in the seat during the rear impact, the frame of the seat must resist movement of the backrest portion of the seat relative to the cushion portion of the seat in response to the force applied by the occupant against the backrest portion of the seat.

The force applied by the occupant against the backrest portion of the seat results in a torque that tends to bend the frame of the seat allowing the backrest portion of the seat to move rearward relative to the cushion portion of the seat.

It would be desirable, therefore, to find a technique for effectively supporting the backrest portion of a seat relative to a cushion portion of a seat during a rear impact to the vehicle.

SUMMARY OF THE INVENTION

The present invention relates to an apparatus comprising a seat for an occupant of a vehicle. The seat comprises a cushion portion and a backrest portion. The apparatus also comprises an actuatable occupant protection device that, when actuated, resists rearward movement of the backrest portion of the seat relative to the cushion portion of the seat. A deflection mechanism of the apparatus is located in the backrest portion of the seat and is movable from a first position to a second, different position by an occupant exerted force that is directed rearward against the backrest portion of the seat. Movement of the deflection mechanism from the first position to the second position actuates the occupant protection device. The deflection mechanism is adapted to move from the first position to the second position without the backrest portion moving significantly relative to cushion portion.

According to a second aspect, the present invention relates to an apparatus comprising a seat for an occupant of a vehicle. The seat includes a cushion portion having a cushion frame that is mounted to the vehicle and a backrest portion having a backrest frame that is supported relative to the cushion frame. The apparatus also comprises a tether having opposite ends that are attached to the cushion frame and the backrest frame, respectively. The tether has a first condition extending along a first route between the cushion frame and the backrest frame and a second condition extending along a second route between the cushion frame and the backrest frame. The tether, in the second condition, resists rearward movement of the backrest frame relative to the cushion frame resulting from a rearward force applied to the backrest portion. The tether is movable from the first condition to the second condition without the backrest portion moving significantly relative to cushion portion.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 3 is a side view of the apparatus of the present invention and illustrates an occupant located in the seat with the actuatable occupant protection device in an unactuated condition;

FIG. 4 is an enlarged view of the apparatus of FIG. 3;

FIG. 5 is a side view of the apparatus of the present invention and illustrates an occupant located in the seat with the actuatable occupant protection device moving between an unactuated condition and an actuated condition;

FIG. 6 is a side view of the apparatus of the present invention and illustrates an occupant located in the seat with the actuatable occupant protection device in an actuated condition;

DETAILED DESCRIPTION OF THE INVENTION

Figure 1:
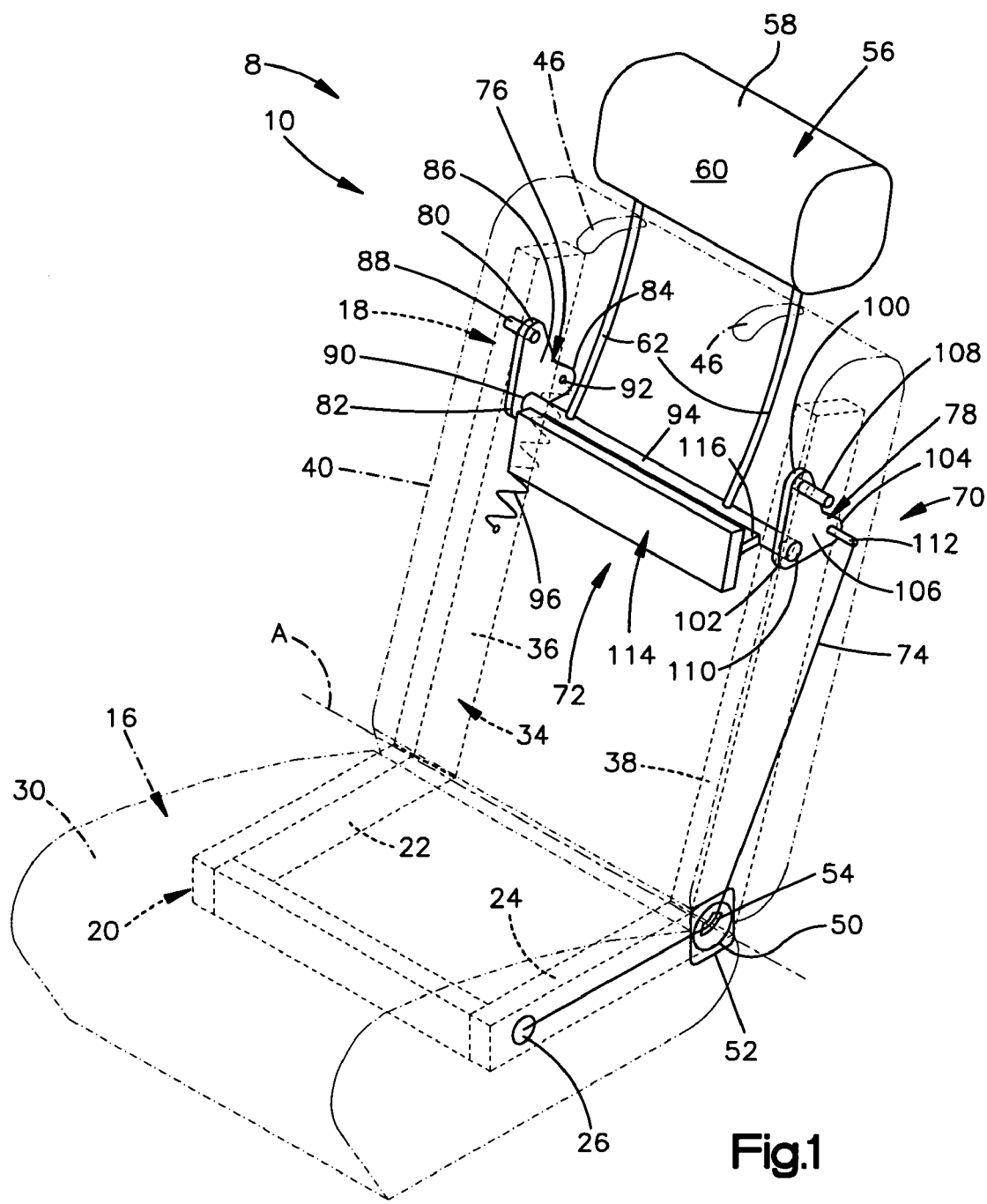
FIG. 1 is a perspective view of an apparatus constructed in accordance with the present invention and including a seat for an occupant of a vehicle and an actuatable occupant protection device in an unactuated condition.

FIG. 1 is a perspective view of an apparatus 8 constructed in accordance with the present invention. The apparatus 8 includes a seat 10 for an occupant 12 (FIG. 3) of a vehicle 14. The seat 10 includes cushion portion 16 and a backrest portion 18. The cushion portion 16 includes a cushion frame 20. The cushion frame 20 is shown by dashed lines in FIGS. 1 and 2 and, for clarity of illustrating other parts of the seat 10, is not shown in FIGS. 3–8. The cushion frame 20 includes right and left frame members 22 and 24, respectively. An anchor 26 is attached to or, alternatively, formed on an outer surface of the left frame member 24.

As shown schematically in FIG. 3, the cushion frame 20 is mountable to the vehicle 14 through rails 28. The rails 28 support the cushion portion 16 of the seat 10 relative to the vehicle 14 and enable forward and rearward movement, to the left and right, respectively, as shown in FIG. 3, of the cushion portion relative to the vehicle. The cushion portion 16 also includes a covering 30. The covering 30 includes an upper surface 32 (FIG. 3) that the occupant 12 of the seat 10 engages.

Figure 2:
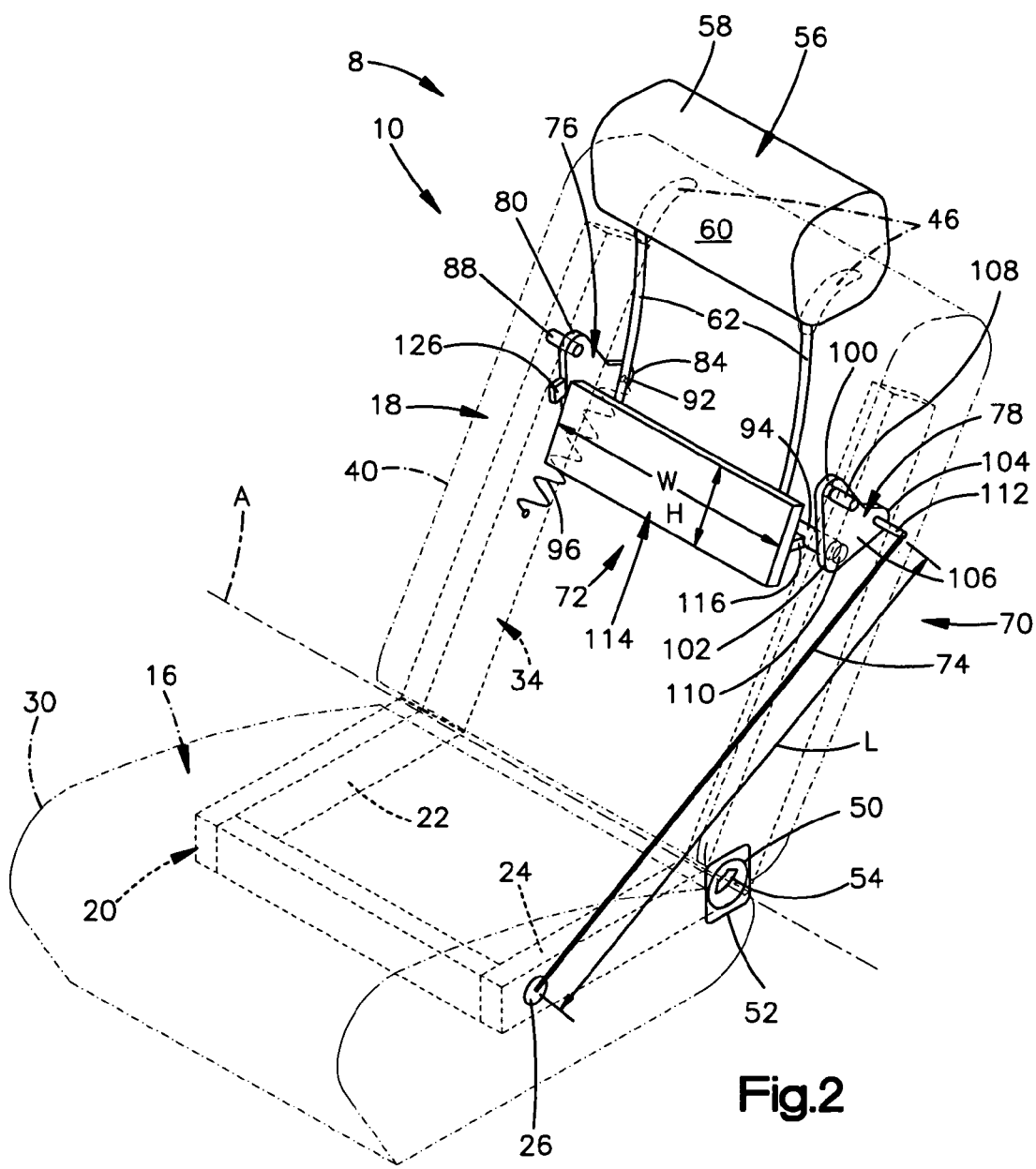
FIG. 2 is a perspective view of the apparatus of the present invention with the actuatable occupant protection device in an actuated condition.

The backrest portion 18 of the seat 10 includes a backrest frame 34. The backrest frame 34 is shown by dashed lines in FIGS. 1 and 2 and, for clarity of illustrating other parts of the seat 10, is not shown in FIGS. 3–8. The backrest frame 34 includes right and left frame members 36 and 38, respectively. The backrest portion 18 of the seat 10 also includes a covering 40. The covering 40 of the backrest portion 18 includes a front surface 42 (FIG. 3) that the occupant 12 of the seat 10 engages and an upper surface 44. As shown in FIGS. 1 and 2, two elongated slots 46 extend though the upper surface 44 of the covering 40 in the backrest portion 18 of the seat 10. Stitching (not shown) in the upper surface 44 of the covering 40 adjacent to the elongated slots 46 may be used to prevent tearing of the covering.

A pivot mechanism 50 pivotally attaches the backrest portion 18 of the seat 10 to the cushion portion 16 of the seat. The pivot mechanism 50 pivotally connects the right frame member 36 of the backrest portion 18 to the right frame member 22 of the cushion portion 16 and also pivotally connects the left frame member 38 of the backrest portion to the left frame member 24 of the cushion portion Thus, the cushion portion 16 of the seat 10 pivotally supports the backrest portion 18 of the seat via the pivot mechanism 50.

The pivot mechanism 50 enables pivotal movement of the backrest portion 18 of the seat 10 relative to the cushion portion 16 of the seat in both forward and rearward directions about pivot axis A (FIGS. 1 and 2). The forward direction of pivotal movement is counter-clockwise as shown in FIG. 3 and the rearward direction of pivotal movement is clockwise as shown in FIG. 3.

Preferably, the pivot mechanism 50 includes a latch mechanism (not shown) that limits the rearward pivotal movement of the backrest portion 18 of the seat 10 relative to the cushion portion 16 to a selected angle. The latch mechanism includes an actuator (not shown) that enables the occupant 12 of the seat 10 to select the angle at which rearward pivotal movement will be limited.

Plastic pivot covers overlie the outboard ends of the pivot mechanism 50. The plastic covers prevent access by the occupant 12 to the moveable parts of the pivot mechanism 50. FIG. 3 illustrates a generally square plastic cover 52 overlying an outboard end of the pivot mechanism 50 on the left side of the seat 10. The plastic pivot cover 52 for the left side of the seat 10 includes an outwardly extending elbow 54. The elbow 54 is located on the plastic pivot cover 52 in a location corresponding to the pivotal axis A of the pivot mechanism 50.

The seat 10 also includes a headrest portion 56 located above the backrest portion 18 of the seat 10. The headrest portion 56 is supported relative to the backrest portion 18 of the seat 10 in a manner that will be described below. A covering 58 envelops the headrest portion 56. The covering 58 includes a front surface 60 that is adapted to be engaged by a rear surface of the head of an occupant 12 of the seat 10. The headrest portion 56 also includes two support arms 62. The support arms 62 of the headrest portion 56 extend downwardly from the headrest portion and into the slots 46 on the upper surface 44 of the covering 40 of the backrest portion 18. The support arms 62 of the headrest portion 56 may have fixed lengths for fixing the position of the headrest portion above the upper surface 44 of the covering 40 of the backrest portion 18. Alternatively, the support arms 62 may include telescoping portions that enable adjustment of the position of the headrest portion 56 above the upper surface 44 of the covering 40 of the backrest portion 18.

The apparatus 8 also includes an occupant protection device 70 that is actuatable in response to a force directed against the front surface 42 of the covering 40 of the backrest portion 18 of the seat 10. The occupant protection device 70 includes a deflection mechanism 72 and a tether 74.

The deflection mechanism 72 includes right and left cranks 76 and 78, respectively. The right and left cranks 76 and 78 shown in FIGS. 1–8 are bell cranks. The right crank 76, shown in FIGS. 1 and 2, includes three vertices. The three vertices include an upper vertex 80, a lower front vertex 82, and a lower rear vertex 84. The right crank 76 also includes an inboard side and an outboard side. FIGS. 1 and 2 only show the inboard side 86 of the right crank 76.

A pivot pin 88 extends outwardly of the outboard side of the right crank 76 from a location near the upper vertex 80. The pivot pin 88 is adapted to connect pivotally the right crank 76 to the right frame member 36 of the backrest portion 18 of the seat 10.

The right crank 76 also includes two apertures. A first aperture 90 is located near the lower front vertex 82 of the right crank 76 and a second aperture 92 is located near the lower rear vertex 84 of the right crank. The first aperture 90 is adapted to support a first end of a support bar 94 of the deflection mechanism 72. The second aperture 92 is adapted to receive a first end of a biasing member 96.

The left crank 78 is a similar to the right crank 76. The left crank 78 also includes three vertices. The three vertices of the left crank 78 include an upper vertex 100, a lower front vertex 102, and a lower rear vertex 104. The left crank 78 also includes an inboard side and an outboard side. FIGS. 1 and 2 only show the outboard side 106 of the left crank 78.

A pivot pin 108 extends outwardly of the outboard side 106 of the left crank 78 from a location near the upper vertex 100. The pivot pin 108 is adapted to connect pivotally the left crank 78 to the left frame member 38 of the backrest portion 18 of the seat 10.

The left crank 78 also includes an aperture 110 near the lower front vertex 102. The aperture 110 is adapted to support a second end of the support bar 94 of the deflection mechanism 72.

A tether pin 112 extends outwardly of the outboard side 106 of the left crank 78 from a location near the lower rear vertex 104. The tether pin 112 has a length that is greater than the length of the pivot pin 108. As a result, when the second crank 78 is pivotally connected to the left frame member 38 of the backrest portion 18, the tether pin 112 extends from a position inside an inboard edge of the left frame member to a position outside of an outboard edge of the left frame member.

The support bar 94 illustrated in FIGS. 1 and 2 is a cylindrical rod having opposite first and second ends. The first end of the support bar 94 is received in the first aperture 90 in the lower front vertex 82 of the right crank 76 and to be fixedly secured to the right crank. The second end of the support bar 94 is received in the aperture 110 in the lower front vertex 102 of the left crank 78 and to be fixedly secured to the left crank.

The two support arms 62 of the headrest portion 56 of the seat 10 are fixedly attached to the outer surface of the support bar 94. The support arms 62 of the headrest portion 56 extend rearward and upward away from the support bar 94, as shown in FIGS. 3 and 4.

The deflection mechanism 72 also includes a deflection plate 114 that is attached to the support bar 94 via a spacer member 116 (FIGS. 1 and 2). The deflection plate 114 is rectangular and, as shown in FIG. 2, is defined by a width W and a height H. The width W of the deflection plate 114 is sized to be smaller than a distance between the inboard edges of the right and left frame members 36 and 38 of the backrest portion 18. The width W is also sized to extend across a majority of the distance between the inboard edges of the right and left frame members 36 and 38 of the backrest portion 18. The deflection plate 114 illustrated in FIGS. 1 and 2 has a width W that is approximately eighty-five percent of the distance between the inboard edges of the right and left frame members 36 and 38. The height H of the deflection plate 114 illustrated in FIGS. 1 and 2 is approximately one-third of the width W of the deflection plate.

The deflection plate 114 illustrated in FIGS. 1 and 2 is generally planar. Alternatively, the deflection plate 114 may be curved so as to conform to a front surface 42 of the covering 40 of the backrest portion 18 of the seat 10.

The spacer member 116 of the deflection mechanism 72 is fixedly attached to the outer surface of the support bar 94 and to the deflection plate 114. The spacer member 116 extends forward from the support bar 94 and supports the deflection plate 114. The spacer member 116 is dimensioned to position the deflection plate 114 of the deflection mechanism 72 near the front surface 42 of the covering 40 of the backrest portion 18 of the seat 10.

The deflection mechanism 72 also includes a biasing member 96. The biasing member 96 illustrated is a spring having opposite first and second ends. The first end of the spring 96 is received in the second aperture 92 of the right crank 76 and to be secured to the right crank. The second end of the spring 96 is received in an aperture in the right frame member 36 of the backrest portion 18 and to be secured to the right frame member.

The tether 74 of the occupant protection device 70 of the apparatus 8 is a flexible member made from a high strength material, such as webbing. Preferably, the tether 74 is made from a material having a web construction with energy absorbing characteristics. The energy absorbing characteristics help to reduce rebound of the occupant that may result from the tether 74 resisting rearward movement of the backrest portion 18 of the seat 10 relative to the cushion portion 16 of the seat. As an alternative to webbing, the tether 74 may be made from a braided metal cable or any other flexible member.

The tether 74 has opposite first and second ends. A length L, shown in FIG. 2, of the tether 74 is defined between the first and second ends. The first end of the tether 74 is secured to the tether pin 112 of the left crank 78 of the deflection mechanism 72. The second end of the tether 74 is secured to the anchor 26 on the left frame member 24 of the cushion portion 16 of the seat 10.

The occupant protection device 70 has an unactuated condition and an actuated condition. FIG. 1 is a perspective view of the apparatus 8 with the occupant protection device 70 in the unactuated condition. FIG. 2 is a perspective view of the apparatus 8 with the occupant protection device 70 in the actuated condition.

Figure 7:
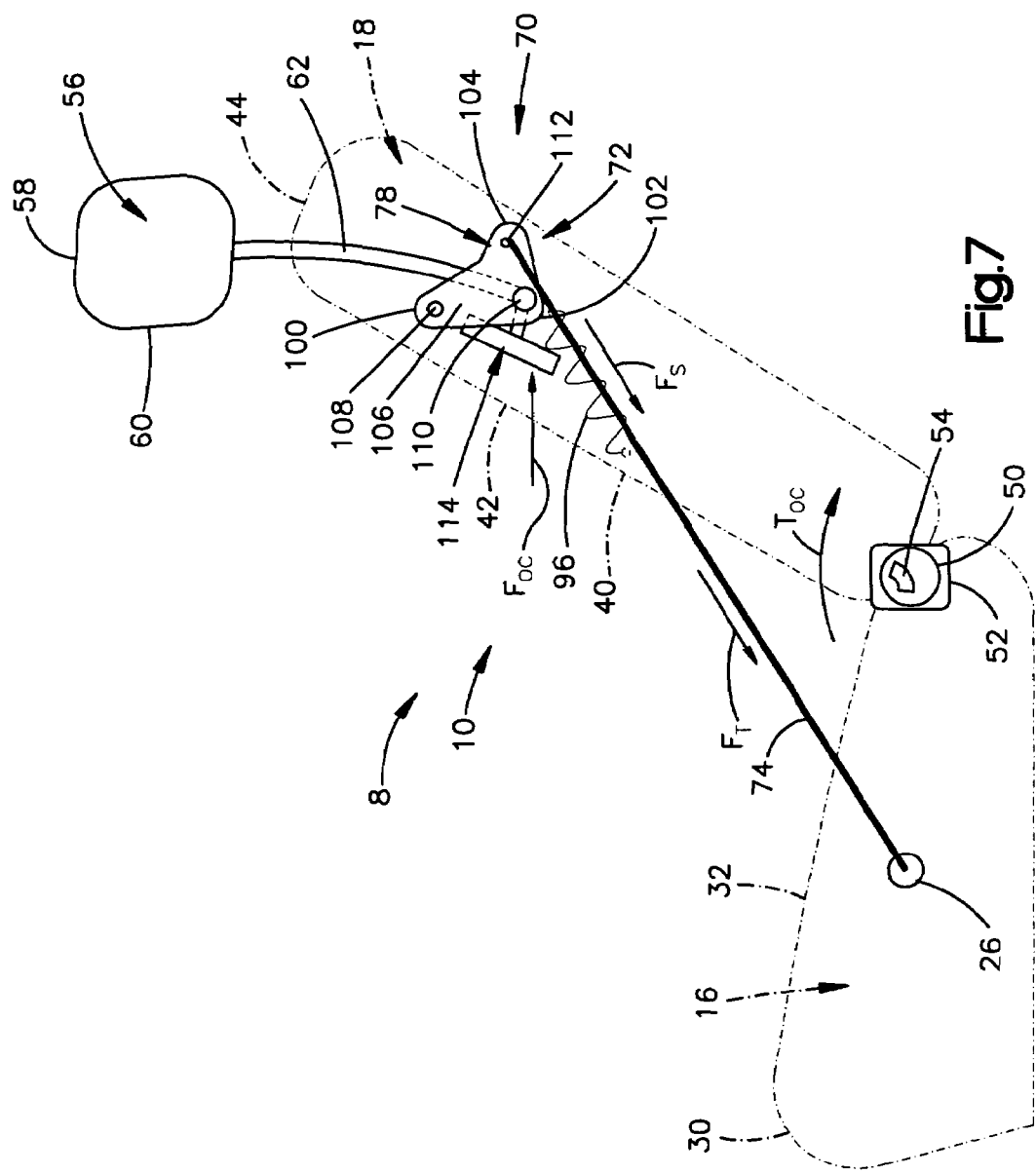
FIG. 7 is an enlarged view of the apparatus of FIG. 6.

FIGS. 3 and 4 illustrate side views of the apparatus 8 with the occupant protection device 70 in the unactuated condition. When the occupant protection device 70 is in the unactuated condition, the deflection mechanism 72 is in a first position relative to the seat 10. The spring 96 urges the deflection mechanism 72 toward the first position. In the first position, the deflection plate 114 of the deflection mechanism 72 is positioned in the seat 10 adjacent to the front surface 42 of the covering 40 of the backrest portion 18. When an occupant 12 of the seat 10 leans against or is pressed against the backrest portion 18 of the seat, as shown in FIG. 3, a force is exerted against the deflection plate 114. The occupant exerted force against the deflection plate is indicated in FIGS. 4, 6, and 7 as $F_{OC}$. The occupant exerted force $F_{OC}$ is transferred through the deflection plate 114, the spacer member 116, and the support bar 94 to the right and left cranks 76 and 78. The occupant exerted force $F_{OC}$ tends to rotate the deflection mechanism 72 in a counter-clockwise direction, as shown in FIGS. 3 and 4, about the pivot pins 88 and 108 of the right and left cranks 76 and 78, respectively, and relative to the frame 34 of the backrest portion 18 of the seat 10. Thus, the occupant exerted force $F_{OC}$ tends to rotate the deflection mechanism 72 away from the first position relative to the seat 10.

The spring 96 exerts a force, indicated as $F_S$, in FIGS. 4 and 7, on the right crank 76 of the deflection mechanism 72 that tends to rotate the deflection mechanism in a clockwise direction, as shown in FIGS. 3 and 4. Thus, the spring force $F_S$ resists rotation of the deflection mechanism 72 away from the first position. The spring force $F_S$ is chosen so as to resist counter-clockwise rotation of the deflection mechanism 72 in response to normally expected occupant exerted forces. Normally expected occupant exerted forces against the backrest portion 18 of the seat 10 have a magnitude that is not indicative of a rear impact to the vehicle 14. Examples of normally expected occupant exerted forces include the forces arising from the occupant 12 becoming seated upon the seat 10 and the forces arising from the occupant 12 shifting in the seat 10.

Since the support arms 62 of the headrest portion 56 of the seat 10 are attached to the support bar 94 of the deflection mechanism 72, the position of the deflection mechanism 72 affects the positioning of the headrest portion 56 relative to the backrest portion 18 of the seat 10. When the deflection mechanism 72 is in the first position, the headrest portion 56 is positioned above the upper surface 44 of the covering 40 of the backrest portion 18 and slightly rearward, to the right as shown in FIG. 3, of the front surface 42 of the covering of the backrest portion. Thus, when the deflection mechanism 72 is in the first position, the headrest portion 56 of the seat 10 is generally spaced away from the head of a properly seated occupant 12, as shown in FIG. 3.

When the occupant protection device 70 is in the unactuated condition, i.e., the deflection mechanism 72 is in the first position, the tether 74 extends along a first route between the anchor 26 and the tether pin 112. The first route is an indirect route between the anchor 26 and the tether pin 112. When extending along the first route, the tether 74 includes a horizontal portion 122 and a vertical portion 124, both of which are shown in FIG. 4. The horizontal portion 122 of the tether 74 extends rearward from the anchor 26 and into the elbow 54 formed on the pivot cover 52. The vertical portion 124 of the tether 74 extends from within the elbow 54 of the pivot cover 52 to the tether pin 112. As shown in FIGS. 3 and 4, the tether 74 is taut along both the horizontal and vertical portions 122 and 124 when extending along the first route.

Since the elbow 54 is located along the pivotal axis A of the pivot mechanism 50, pivotal movement of the backrest portion 18 of the seat 10 relative to the cushion portion 16 of the seat does not result in any tensioning or loosening of the tether 74. Moreover, the elbow 54 of the pivot cover 52 is designed to tear when subjected to a predetermined force from the tether 74. The tether 74 applies a force to the elbow 54 of the pivot cover 52 when the deflection mechanism 72 moves away from the first position and the first end of the tether 74 is moved away from the elbow 54. When the tether 74 applies the predetermined force to the elbow 54, the elbow 54 tears and no longer supports the tether 74 along the first route between the anchor 26 and the tether pin 112. Since the elbow 54 supports the tether 74 along the first route until the elbow 54 tears, a force, indicated as $F_{EL}$ in FIG. 4, directed along the vertical portion 124 of the tether 74 aids the spring 96 in resisting rotation of the deflection mechanism 72 away from the first position.

In the event of a rear impact to the vehicle 14, the vehicle 14 is accelerated forward relative to the occupant 12. As a result of the vehicle 14 accelerating forward relative to the occupant 12, the occupant exerted force $F_{OC}$ against the deflection plate 114 of the deflection mechanism 72 increases. When the occupant exerted force $F_{OC}$ is greater than the sum of the spring force $F_S$ and the force $F_{EL}$ necessary to rupture the elbow 54 of the pivot cover 52, the deflection mechanism 72 begins to rotate in the counter-clockwise direction, as viewed in FIGS. 3 and 4, and away from the first position.

FIG. 5 illustrates a side view of the apparatus 8 with the occupant protection device 70 moving between an unactuated condition and an actuated condition. As the deflection mechanism 72 rotates counter-clockwise about the pivot pins 88 and 108, the lower rear vertices 84 and 104 of the right and left cranks 76 and 78, respectively, move upwardly. The upward movement of the lower rear vertex 108 of the left crank 78 tensions the tether 74 and applies a force to the elbow 54 of the pivot cover, which supports the tether 74 along the first route. When the elbow 54 of the pivot cover 52 tears, the tether 74 is free to move out of the first route and away from the elbow 54, as shown in FIG. 5. The upward movement of the lower rear vertex 84 of the right crank 76 causes the spring 96 to be stretched. As the spring 96 is stretched, the spring force $F_S$ increases. If the occupant exerted force $F_{OC}$ continues to be greater than the spring force $F_S$, the deflection mechanism 72 continues rotating in the counter-clockwise direction. If the occupant exerted force $F_{OC}$ falls below the spring force $F_S$, the deflection mechanism 72 returns to the first position and the tether 74 hangs loosely or in a festooned manner between the anchor 26 and the tether pin 112.

Also as shown in FIG. 5, the rotation of the deflection mechanism 72 away from the first position causes the headrest portion 56 of the seat 10 to move relative to the backrest portion 18 of the seat. As the deflection mechanism 72 rotates counter-clockwise, the support bar 94 of the deflection mechanism 72 is rotated relative to the upper surface 44 of the covering 40 of the backrest portion 18 of the seat 10. The rotation of the support bar 94 of the deflection mechanism 72 causes the headrest portion 56 of the seat 10 to move forward, to the left in FIG. 5, toward the front surface 42 of the covering 40 of the backrest portion 18 and, thus, toward the head of the occupant 12 of the seat 10.

FIGS. 6 and 7 show a side view of the apparatus 8 with the actuatable occupant protection device 70 in the actuated condition. When the occupant protection device 70 is in the actuated condition, the deflection mechanism 72 is in a second position relative to the seat 10. The deflection mechanism may be moved from the first position to the second position without the backrest portion 18 of the seat 10 moving relative to cushion portion 16. A ratchet or locking mechanism 126, shown schematically in FIG. 2, locks the deflection mechanism 72 in the second position to lock the occupant protection device 70 in the actuated condition.

Also, when the occupant protection device 70 is in the actuated condition, the tether 74 extends along a second route between the anchor 26 and the tether pin 112. The second route is a direct route between the anchor 26 and the tether pin 112. As shown in FIGS. 6 and 7, the tether 74 is taut when extending along the second route. The tether 74, when extending along the second route, helps to prevent rearward movement of the backrest portion 18 of the seat 10 relative to the cushion portion 16 of the seat.

Moreover, when the deflection mechanism 72 is in the second position, the headrest portion 56 of the seat 10 extends forward, to the left as shown in FIG. 6, of the front surface 42 of the covering 40 of the backrest portion 18 of the seat 10. In the position shown in FIG. 6, the headrest portion 56 of the seat 10 engages and supports the head of the occupant 12 of the seat for helping to preventing injuries, such as whiplash, that may result from the rear impact to the vehicle 14.

In the event of a rear impact to the vehicle 14, the occupant exerted force $F_{OC}$ against the deflection plate 114 of the deflection mechanism 72 may become quite large. FIG. 6 illustrates the occupant exerted force $F_{OC}$ as being directed rearward from the center of mass $M_C$ of the seated occupant. The occupant exerted force $F_{OC}$ results in a torque $T_{OC}$ (FIG. 7) about the pivot mechanism 50 that tends to rotate the backrest portion 18 of the seat 10 rearward, clockwise as shown in FIGS. 6 and 7, relative to the cushion portion 16 of the seat. The torque $T_{OC}$ about the pivot mechanism 50 is defined by the following equation:

$$T_{OC} = F_{OC} \times D$$

where D is the vertical distance between the pivotal axis A of the pivot mechanism 50 and the center of mass $M_C$ of the seated occupant 12.

When the occupant protection device 70 is in the actuated condition, a force, indicated as $F_T$ in FIG. 7, arises along the tether 74. The force $F_T$ along the tether 74 helps prevent the rearward rotation of the backrest portion 18 of the seat 10 relative to the cushion portion 16 resulting from the occupant exerted force $F_{OC}$.

Unlike prior art seats in which the pivot mechanism alone must resist the torque $T_{OC}$, the actuatable occupant protection device 70 of the present invention helps to support the backrest portion 18 of the seat 10 relative to the cushion portion 16 so as to prevent rearward rotation of the backrest portion relative to the cushion portion as a result of the occupant exerted force $F_{OC}$. As a result, the occupant protection device 70 of the present invention enables a vehicle designer to use a lighter pivot mechanism 50. Additionally, the apparatus 8 of the present invention provides support to the head of the occupant 12 to help reduce the likelihood of head and neck injuries resulting from a rear impact to the vehicle 14.

Another important feature of the apparatus 8 is that the deflection mechanism 72 may be moved from the first position to the second position without the backrest portion 18 of the seat 10 moving significantly relative to cushion portion 16. Although a slight movement of the backrest portion 18 of the seat 10 relative to the cushion portion 16 may occur, this feature enables the occupant protection device 70 to be actuated while the relative position between the backrest portion 18 and the cushion portion 16 is generally maintained. This is particularly important when the seat 10 is a front seat of the vehicle 14 as potential injuries to an occupant of a rear seat may be avoided by the occupant protection device 70 being actuated without significant movement of the backrest portion 18 toward the rear seat.

Figure 8:
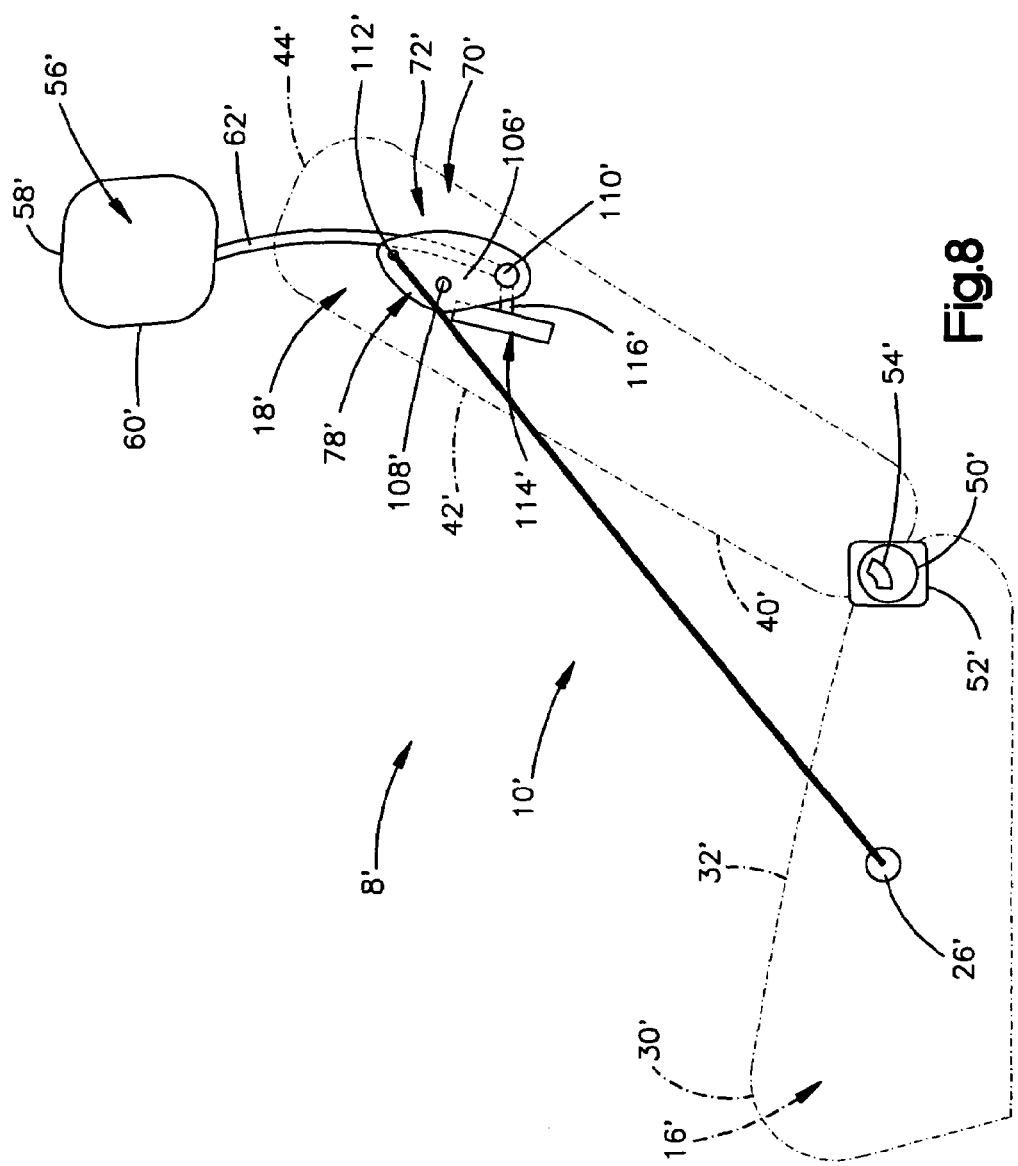
FIG. 8 is a side view of an apparatus constructed in accordance with a second embodiment of the present invention and including a seat for an occupant of a vehicle and an actuatable occupant protection device in an actuated condition.

FIG. 8 is a side view of an apparatus 8' constructed in accordance with a second embodiment of the present invention. Features of FIG. 8 that perform a similar function as those described with regard to FIGS. 1–7 are indicated by the same reference numbers with the addition of a prime.

FIG. 8 illustrates the occupant protection device 70' for the apparatus 8' in the actuated condition. In the actuated condition, the tether pin 112' has rotated to an over-center position relative to the pivot pin 108'. The over-center position means that during rotation of the deflection mechanism 72' from the first position to the second position, the tether pin 112' rotates from a first side of the pivot pin 108' to a second side of the pivot pin with relation to a line extending between anchor 26' and the pivot pin. As a result, the deflection mechanism 72' is prevented from rotating toward the first position when in the second position, i.e., clockwise as shown in FIG. 8, in response to the tether force $F_T$. When the tether pin 112' rotates to an over-center position relative to the pivot pin 108', the ratchet mechanism 126, illustrated in FIG. 2, is unnecessary and may be eliminated.

Figure 9:
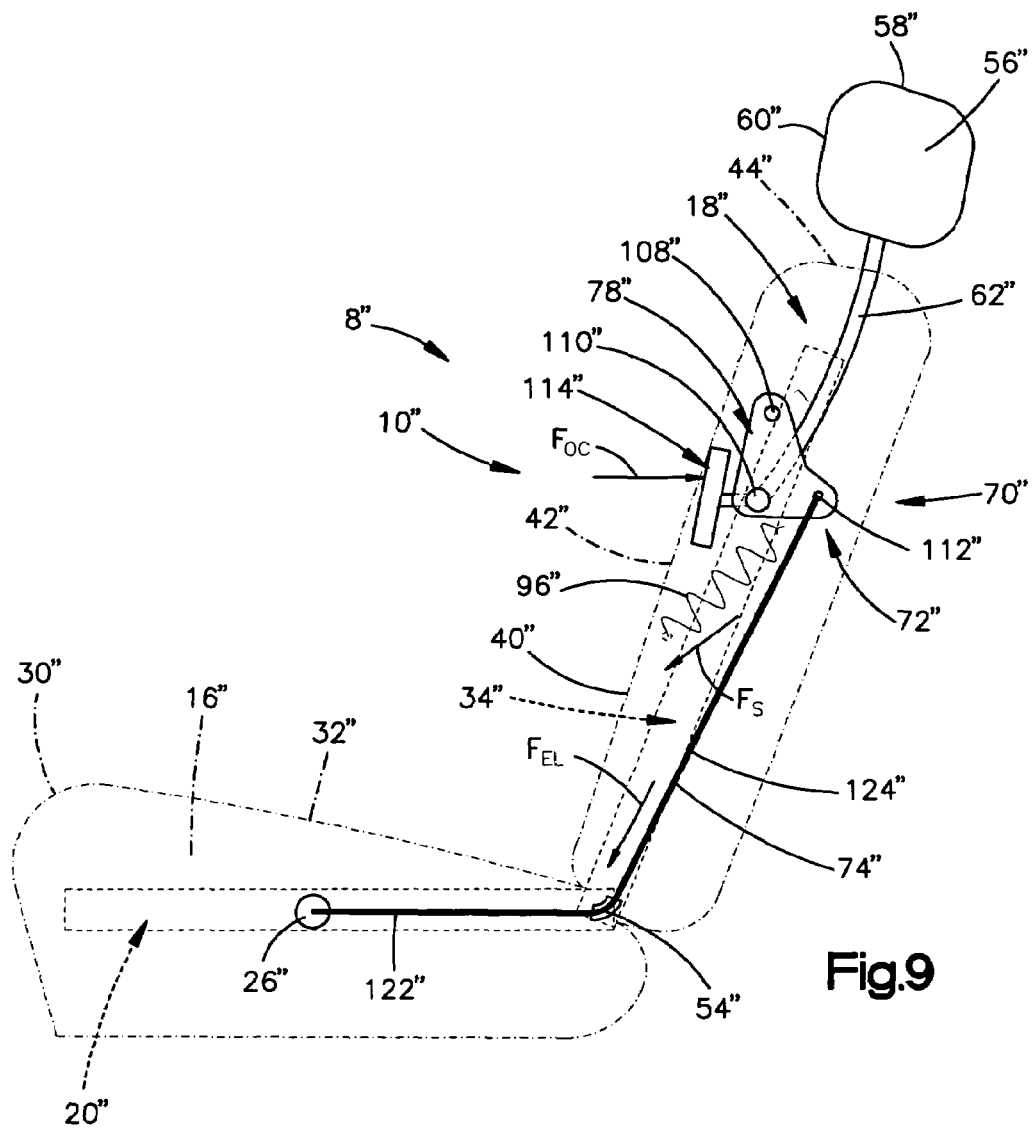
FIG. 9 is a side view of an apparatus constructed in accordance with a third embodiment of the present invention and including a seat for an occupant of a vehicle and an actuatable occupant protection device in an unactuated condition.

FIG. 9 is a side view of an apparatus 8" constructed in accordance with a third embodiment of the present invention. Features of FIG. 9 that perform the same or similar functions as those described with regard to FIGS. 1–7 are identified by the same reference numbers with the addition of a double prime.

The seat 10" of the apparatus 8" of FIG. 9 includes a cushion portion 16" and a backrest portion 18". The cushion portion 16" includes a cushion frame 20". An anchor 26' is attached to or, alternatively, formed on the cushion frame 20".

The backrest portion 18" of the seat 10" includes a backrest frame 34". The backrest frame 34" is fixed relative to the cushion frame 20". For example, the backrest frame 34" may be welded to the cushion frame 20". As a result, the seat 10" of FIG. 9 is free of a pivot mechanism and does not support pivotal movement of the backrest portion 18" of the seat, as was described with reference to the seat 10 of FIGS. 1–7.

The seat 10" also includes coverings 30" and 40" for the cushion portion 16" and the backrest portion 18", respectively. The covering 30" of the cushion portion 16" includes an upper surface 32" that is engaged by an occupant (not shown) of the seat 10". The covering 40" of the backrest portion 18" of the seat 10" includes a front surface 42" and an upper surface 44". A plastic tether support elbow 54" is located on a side of the covering 30" of the cushion portion 16" of the seat 10" at a location near the backrest portion 18".

The seat 10" also includes a headrest portion 56" located above the backrest portion 18". The headrest portion 56" is supported relative to the backrest portion 18" of the seat 10" in the same manner as that described with reference to the headrest portion 56 of the seat 10 of FIGS. 1–7. A covering 58" envelops the headrest portion 56". The covering 58" includes a front surface 60" that is adapted to be engaged by a rear surface of the head of an occupant of the seat 10". The headrest portion 56" also includes two support arms 62", only one of which is shown in FIGS. 9 and 10.

Figure 10:
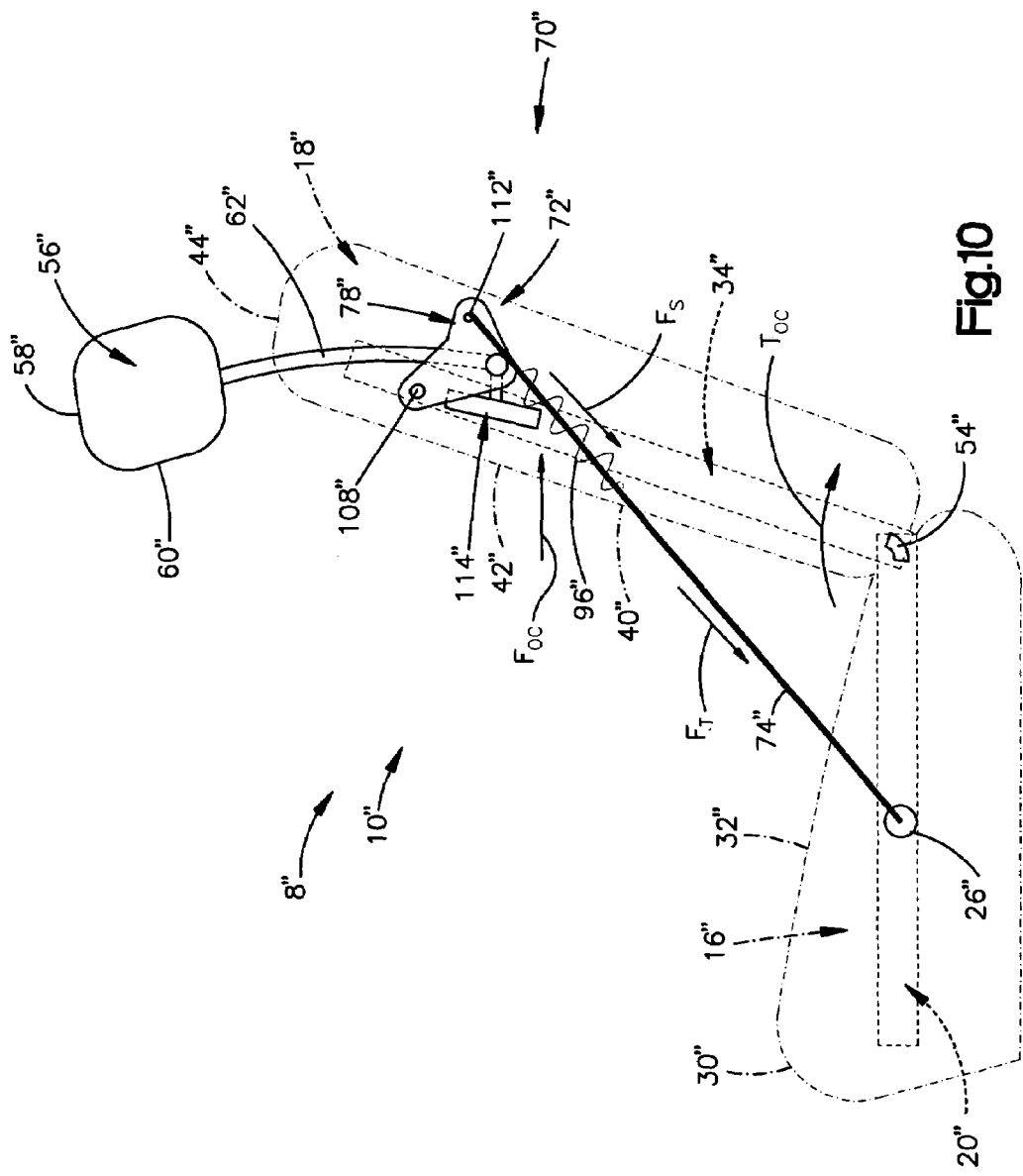
FIG. 10 is a side view of the apparatus of the FIG. 9 and including the seat for an occupant of a vehicle and the actuatable occupant protection device in an actuated condition.

An occupant protection device 70" of the apparatus 8" of FIG. 10 is identical to and operates in the same manner as the occupant protection device 70 described with reference to FIGS. 1–7. The occupant protection device 70" includes a deflection mechanism 72" and a tether 74".

The occupant protection device 70" of the apparatus 8" has an unactuated condition and an actuated condition. FIG. 9 illustrates the occupant protection device 70" in the unactuated condition and, FIG. 10 illustrates the occupant protection device 70" in the actuated condition.

When the occupant protection device 70" is in the unactuated condition, the deflection mechanism 72" is in a first position relative to the seat 10". A spring 96" urges the deflection mechanism 72" toward the first position. In the first position, a deflection plate 114" of the deflection mechanism 72" is positioned in the seat 10" adjacent to the front surface 42" of the covering 40" of the backrest portion 18". When an occupant of the seat 10" is pressed against the backrest portion 18" of the seat, a force is exerted against the deflection plate 114". The occupant exerted force is indicated in FIGS. 9 and 10 as $F_{OC}$. The occupant exerted force $F_{OC}$ is transferred from the deflection plate 114" to cranks of the deflection mechanism 72". FIGS. 9 and 10 illustrate one of the cranks at 78". The occupant exerted force $F_{OC}$ tends to rotate the deflection mechanism 72" in a counter-clockwise direction, as viewed in FIG. 9, about pivot pins of the cranks. FIGS. 9 and 10 illustrate pivot pin 108" of crank 78". Thus, the occupant exerted force $F_{OC}$ tends to rotate the deflection mechanism 72" away from the first position relative to the seat 10".

The spring 96" exerts a force, indicated as $F_S$, in FIGS. 9 and 10, that tends to rotate the deflection mechanism 72" in a clockwise direction, as viewed in FIG. 9. Thus, the spring force $F_S$ resists rotation of the deflection mechanism 72" away from the first position. The spring force $F_S$ is chosen so as to resist counter-clockwise rotation of the deflection mechanism 72" in response to normally expected occupant exerted forces. Normally expected occupant exerted forces against the backrest portion 18" of the seat 10" have a magnitude that is not indicative of a rear impact to the vehicle.

Since the support arms 62" of the headrest portion 56" of the seat 10" are attached to the deflection mechanism 72", as was discussed with reference to the apparatus 8 of FIGS. 1–7, the position of the deflection mechanism 72" affects the positioning of the headrest portion 56" relative to the backrest portion 18" of the seat 10". When the deflection mechanism 72" is in the first position, the headrest portion 56" is positioned above the upper surface 44" of the covering 40" of the backrest portion 18" and slightly rearward, i.e., to the right as viewed in FIG. 9, of the front surface 42" of the covering of the backrest portion. Thus, when the deflection mechanism 72" is in the first position, the headrest portion 56" of the seat 10" is generally spaced away from the head of a properly seated occupant.

When the occupant protection device 70" is in the unactuated condition, i.e., the deflection mechanism 72" is in the first position, the tether 74" extends along a first route between the anchor 26" and the tether pin 112". The first route is an indirect route between the anchor 26" and a tether pin 112" of the deflection mechanism 72". When extending along the first route, the tether 74" includes a horizontal portion 122" and a vertical portion 124", both of which are shown in FIG. 9. The horizontal portion 122" of the tether 74" extends rearward from the anchor 26" and into the tether support elbow 54". The vertical portion 124" of the tether 74" extends from the tether support elbow 54" to the tether pin 112".

The tether support elbow 54" is designed to tear when subjected to a predetermined force from the tether 74". The tether 74" applies a force to the tether support elbow 54" when the deflection mechanism 72" moves away from the first position. When the tether 74" applies the predetermined force to the tether support elbow 54", the tether support elbow 54" tears and no longer supports the tether 74" along the first route between the anchor 26" and the tether pin 112". Since the tether support elbow 54" supports the tether 74" along the first route until the tether support elbow 54" tears, a force, indicated as $F_{EL}$ in FIG. 9, directed along the vertical portion 124" of the tether 74" aids the spring 96" in resisting rotation of the deflection mechanism 72" away from the first position.

In the event of a rear impact to the vehicle, the vehicle is accelerated forward relative to the occupant. As a result of the vehicle accelerating forward relative to the occupant, the occupant exerted force $F_{OC}$ against the deflection plate 114" of the deflection mechanism 72" increases. When the occupant exerted force $F_{OC}$ is greater than the sum of the spring force $F_S$ and the force $F_{EL}$ necessary to tear the tether support elbow 54", the deflection mechanism 72" begins to rotate in the counter-clockwise direction, as viewed in FIG. 9, and away from the first position.

When the tether support elbow 54" tears, the tether 74" is released and is free to move out of the first route and away from the tether support elbow 54". As the deflection mechanism 72" rotates in the counter-clockwise direction, as viewed in FIG. 9, the spring 96" is stretched. As the spring 96" is stretched, the spring force $F_S$ increases. If the occupant exerted force $F_{OC}$ continues to be greater than the spring force $F_S$, the deflection mechanism 72" continues rotating in the counter-clockwise direction. If the occupant exerted force $F_{OC}$ falls below the spring force $F_S$, the deflection mechanism 72" returns to the first position and the tether 74" hangs loosely or in a festooned manner between the anchor 26" and the tether pin 112".

The rotation of the deflection mechanism 72" away from the first position causes the headrest portion 56" of the seat 10" to move relative to the backrest portion 18" of the seat. As the deflection mechanism 72" rotates counter-clockwise, the headrest portion 56" of the seat 10" is moved forward, to the left as viewed in FIG. 9, toward the front surface 42" of the covering 40" of the backrest portion 18" and, thus, toward the head of the occupant of the seat 10".

FIG. 10 shows a side view of the apparatus 8" with the actuatable occupant protection device 70" in the actuated condition. When the occupant protection device 70" is in the actuated condition, the deflection mechanism 72" is in a second position relative to the seat 10". The deflection mechanism 72" may be moved from the first position to the second position without the backrest portion 18" of the seat 10" moving relative to cushion portion 16". A locking mechanism (not shown) locks the deflection mechanism 72" in the second position to lock the occupant protection device 70" in the actuated condition.

When the occupant protection device 70" is in the actuated condition, the tether 74" extends along a second route between the anchor 26" and the tether pin 112". The second route is a direct route between the anchor 26" and the tether pin 112". As shown in FIG. 10, the tether 74" is taut when extending along the second route. The tether 74", when extending along the second route, helps to prevent rearward movement of the backrest portion 18" of the seat 10" relative to the cushion portion 16" of the seat.

In the event of a rear impact to the vehicle, the occupant exerted force $F_{OC}$ against the deflection plate 114" of the deflection mechanism 72" may become quite large. The occupant exerted force $F_{OC}$ results in a torque $T_{OC}$ (FIG. 10) that tends to bend the backrest frame 34". The backrest frame 34" tends to bend at a location adjacent the cushion frame 20" and results in the backrest portion 18" of the seat 10" moving rearward relative to the cushion portion 16" of the seat.

When the occupant protection device 70" is in the actuated condition, a force, indicated as $F_T$ in FIG. 10, arises along the tether 74". The force $F_T$ along the tether 74" helps prevent the rearward movement of the backrest portion 18" of the seat 10" relative to the cushion portion 16" resulting from the occupant exerted force $F_{OC}$.

From the above description of the invention, those skilled in the art will perceive improvements, changes and modifications. Such improvements, changes and modifications within the skill of the art are intended to be covered by the appended claims.

Having described the invention, I claim the following:

1. An apparatus comprising:
  a seat for an occupant of a vehicle, the seat comprising a cushion portion and a backrest portion;
  an actuatable occupant protection device that, when actuated, resists rearward movement of the backrest portion of the seat relative to the cushion portion of the seat; and
  a deflection mechanism located in the backrest portion of the seat and being movable from a first position to a second, different position by an occupant exerted force that is directed rearward against the backrest portion of the seat, movement of the deflection mechanism from the first position to the second position actuating the occupant protection device, the deflection mechanism adapted to move from the first position to the second position without the backrest portion moving significantly relative to the cushion portion.

2. The apparatus of claim 1 wherein the seat is free of a pivot mechanism between the backrest portion and the cushion portion.

3. The apparatus of claim 1 wherein a headrest portion of the seat extends above the backrest portion of the seat and is attached to the occupant protection device, actuation of the occupant protection device moving the headrest portion forward relative to the backrest portion of the seat.

4. The apparatus of claim 1 wherein the occupant protection device includes at least one tether, the tether extending along a first route between the cushion portion and the backrest portion when the occupant protection device is in an unactuated condition and extending along a second route, different from the first route, when the occupant protection device is in an actuated condition.

5. The apparatus of claim 4 wherein the cushion portion of the seat includes a cushion frame and the backrest portion of the seat includes a backrest frame, the tether connecting the cushion frame and the backrest frame.

6. The apparatus of claim 4 wherein the tether is made of webbing or a flexible cable.

7. The apparatus of claim 4 wherein the tether has energy absorbing characteristics.

8. The apparatus of claim 4 wherein the deflection mechanism is pivotally connected to a backrest frame of the backrest portion of the seat and pivots relative to the backrest frame in response to the occupant exerted force directed rearward against the backrest portion of the seat exceeding a predetermined value, the tether being attached to the deflection mechanism and being moved from the first route to the second route during pivotal movement of the deflection mechanism relative to the backrest frame.

9. The apparatus of claim 8 wherein the seat is free of a pivot mechanism between the backrest portion and the cushion portion.

10. The apparatus of claim 4 further including means for locking the occupant protection device in the actuated condition for maintaining the tether along the second route.

11. The apparatus of claim 10 wherein the means for locking includes a bell crank to which the tether is connected, movement of the deflection mechanism to the second position rotating the bell crank to an over-center position for maintaining the tether along the second route.

12. The apparatus of claim 4 further including structure for supporting the tether along the first route, the structure adapted to release the tether in response to the tether applying a predetermined force to the structure.

13. The apparatus of claim 12 wherein the structure is located along a pivotal axis of a pivot mechanism of the seat, the pivot mechanism enabling pivotal movement of the backrest portion of the seat relative to the cushion portion of the seat while the tether extends along the first route.

14. An apparatus comprising:
a seat for an occupant of a vehicle, the seat including a cushion portion having a cushion frame that is mounted to the vehicle and a backrest portion having a backrest frame that is supported relative to the cushion frame; and
a tether having opposite ends attached to the cushion frame and the backrest frame, respectively, the tether having a first condition extending along a first route between the cushion frame and the backrest frame and a second condition extending along a second route between the cushion frame and the backrest frame, the tether in the second condition resisting rearward movement of the backrest frame relative to the cushion frame resulting from a rearward force applied to the backrest portion, the tether being movable from the first condition to the second condition without the backrest portion moving significantly relative to the cushion portion, wherein said tether does not bias a part of the apparatus.

15. The apparatus of claim 14 wherein a pivot mechanism pivotally connects the backrest portion of the seat to the cushion portion of the seat, the opposite ends of the tether being attached to the cushion frame and the backrest frame at locations spaced away from the pivot mechanism.

16. The apparatus of claim 14 wherein the tether is made of one of webbing and a flexible cable.

17. The apparatus of claim 14 wherein the tether has energy absorbing characteristics.

18. An apparatus comprising:
a seat for an occupant of a vehicle, the seat including a cushion portion having a cushion frame that is mounted to the vehicle and a backrest portion having a backrest frame that is supported relative to the cushion frame; and
a tether having opposite ends attached to the cushion frame and the backrest frame, respectively, the tether having a first condition extending along a first route between the cushion frame and the backrest frame and a second condition extending along a second route between the cushion frame and the backrest frame, the tether in the second condition resisting rearward movement of the backrest frame relative to the cushion frame resulting from a rearward force applied to the backrest portion, the tether being movable from the first condition to the second condition without the backrest portion moving significantly relative to the cushion portion, structure for supporting the tether in the first condition along the first route, the structure adapted to release the tether in response to the tether applying a predetermined force to the structure.

19. An apparatus comprising:
a seat for an occupant of a vehicle, the seat including a cushion portion having a cushion frame that is mounted to the vehicle and a backrest portion having a backrest frame that is supported relative to the cushion frame; and
a tether having opposite ends attached to the cushion frame and the backrest frame, respectively, the tether having a first condition extending along a first route between the cushion frame and the backrest frame and a second condition extending along a second route between the cushion frame and the backrest frame, the tether in the second condition resisting rearward movement of the backrest frame relative to the cushion frame resulting from a rearward force applied to the backrest portion, the tether being movable from the first condition to the second condition without the backrest portion moving significantly relative to the cushion portion, a deflection mechanism that is responsive to the rearward force applied to the backrest portion for moving the tether from the first condition to the second condition.

20. The apparatus of claim 19 wherein a headrest portion of the seat extends above the backrest portion of the seat and is attached to the deflection mechanism, the headrest portion moving forward relative to the backrest portion of the seat in response to the deflection mechanism moving the tether from the first condition to the second condition.

21. The apparatus of claim 19 wherein the deflection mechanism is pivotally connected to the backrest frame and pivots relative to the backrest frame in response to the rearward force applied to the backrest portion exceeding a predetermined value, the tether being attached to the deflection mechanism and being moved from the first condition to the second condition during pivotal movement of the deflection mechanism.

22. The apparatus of claim 21 wherein the seat is free of a pivot mechanism between the backrest portion and the cushion portion.

23. The apparatus of claim 21 further including means for locking the deflection mechanism in response to the deflection mechanism moving the tether to the second condition for maintaining the tether along the second route between the cushion frame and the backrest frame.

24. The apparatus of claim 23 wherein the means for locking includes a bell crank of the deflection mechanism, pivotal movement of the deflection mechanism to the second position rotating the bell crank to an over-center position for maintaining the tether along the second route.

25. An apparatus comprising:
a seat for an occupant of a vehicle, the seat including a cushion portion having a cushion frame that is mounted to the vehicle and a backrest portion having a backrest frame that is supported relative to the cushion frame; and
a tether having opposite ends attached to the cushion frame and the backrest frame, respectively, the tether having a first condition extending along a first route between the cushion frame and the backrest frame and a second condition extending along a second route between the cushion frame and the backrest frame, the tether in the second condition resisting rearward movement of the backrest frame relative to the cushion frame resulting from a rearward force applied to the backrest portion, the tether being movable from the first condition to the second condition without the backrest portion moving significantly relative to the cushion portion, wherein the seat is free of a pivot mechanism between the backrest portion and the cushion portion.

26. An apparatus comprising:
a seat for an occupant of a vehicle, the seat including a cushion portion having a cushion frame that is mounted to the vehicle and a backrest portion having a backrest frame that is supported relative to the cushion frame; and
a tether having opposite ends attached to the cushion frame and the backrest frame, respectively, the tether having a first condition extending along a first route between the cushion frame and the backrest frame and a second condition extending along a second route between the cushion frame and the backrest frame, the tether in the second condition resisting rearward movement of the backrest frame relative to the cushion frame resulting from a rearward force applied to the backrest portion, the tether being movable from the first condition to the second condition without the backrest portion moving significantly relative to the cushion portion, wherein the backrest portion of the seat is fixed relative to the cushion portion of the seat, the tether, when in the second condition, resisting bending of the backrest frame.

* * * * *